United States Patent
Hirzallah et al.

(10) Patent No.: US 11,496,194 B2
(45) Date of Patent: Nov. 8, 2022

(54) METHODS AND APPARATUS FOR GROUP BEAM REPORTING FOR BEAM SQUINT

(71) Applicant: QUALCOMM Incorporated, San Diego, CA (US)

(72) Inventors: Mohammed Hirzallah, San Diego, CA (US); Arumugam Chendamarai Kannan, San Diego, CA (US); Srinivas Yerramalli, Hyderabad (IN); Xiaoxia Zhang, San Diego, CA (US); Vasanthan Raghavan, West Windsor Township, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/131,560

(22) Filed: Dec. 22, 2020

(65) Prior Publication Data
US 2022/0200682 A1    Jun. 23, 2022

(51) Int. Cl.
*H04B 7/06*    (2006.01)
*H04B 7/08*    (2006.01)

(52) U.S. Cl.
CPC ......... *H04B 7/0626* (2013.01); *H04B 7/0617* (2013.01); *H04B 7/0639* (2013.01); *H04B 7/0857* (2013.01)

(58) Field of Classification Search
CPC .. H04B 7/0626; H04B 7/0617; H04B 7/0639; H04B 7/085
See application file for complete search history.

(56) References Cited

U.S. PATENT DOCUMENTS

| 10,952,236 | B2* | 3/2021 | Nilsson | H04L 5/0053 |
| 2016/0183230 | A1* | 6/2016 | Park | H04W 72/087 |
| | | | | 455/452.2 |
| 2017/0244451 | A1* | 8/2017 | Raghavan | H04B 7/0617 |
| 2018/0062724 | A1 | 3/2018 | Onggosanusi et al. | |
| 2018/0199258 | A1* | 7/2018 | Cezanne | H04W 40/06 |
| 2019/0124639 | A1* | 4/2019 | Nilsson | H04B 7/0617 |

(Continued)

FOREIGN PATENT DOCUMENTS

WO    2020063719 A1    4/2020

OTHER PUBLICATIONS

International Search Report and Written Opinion—PCT/US2021/056880—ISA/EPO —Feb. 24, 2022.

*Primary Examiner* — Jaison Joseph
(74) *Attorney, Agent, or Firm* — Procopio, Cory, Hargreaves & Savitch LLP

(57) ABSTRACT

The present disclosure relates to methods and devices for wireless communication of an apparatus, e.g., a UE and/or a base station. In one aspect, the apparatus may measure a plurality of beams from a base station or a UE, the plurality of beams corresponding to a plurality of subbands of a wideband channel. The apparatus may also determine whether the plurality of beams include one or more candidate beam groups for each subband of the plurality of subbands. Additionally, the apparatus may transmit, upon determining that the plurality of beams include one or more candidate beam groups for at least one subband of the plurality of subbands, an indication of the one or more candidate beam groups for the at least one subband of the plurality of subbands.

30 Claims, 10 Drawing Sheets

(56) References Cited

U.S. PATENT DOCUMENTS

| | | | |
|---|---|---|---|
| 2019/0159203 A1* | 5/2019 | Kim | H04W 48/10 |
| 2020/0083939 A1 | 3/2020 | Park et al. | |
| 2020/0136705 A1* | 4/2020 | Li | H04B 7/0626 |
| 2020/0145977 A1* | 5/2020 | Kumar | H04L 5/0048 |
| 2020/0162207 A1* | 5/2020 | Hwang | H04L 1/1812 |
| 2020/0266870 A1* | 8/2020 | Yoon | H04B 17/318 |
| 2022/0007351 A1* | 1/2022 | Ma | H04W 72/1289 |
| 2022/0095376 A1* | 3/2022 | Yoon | H04W 74/0866 |

* cited by examiner

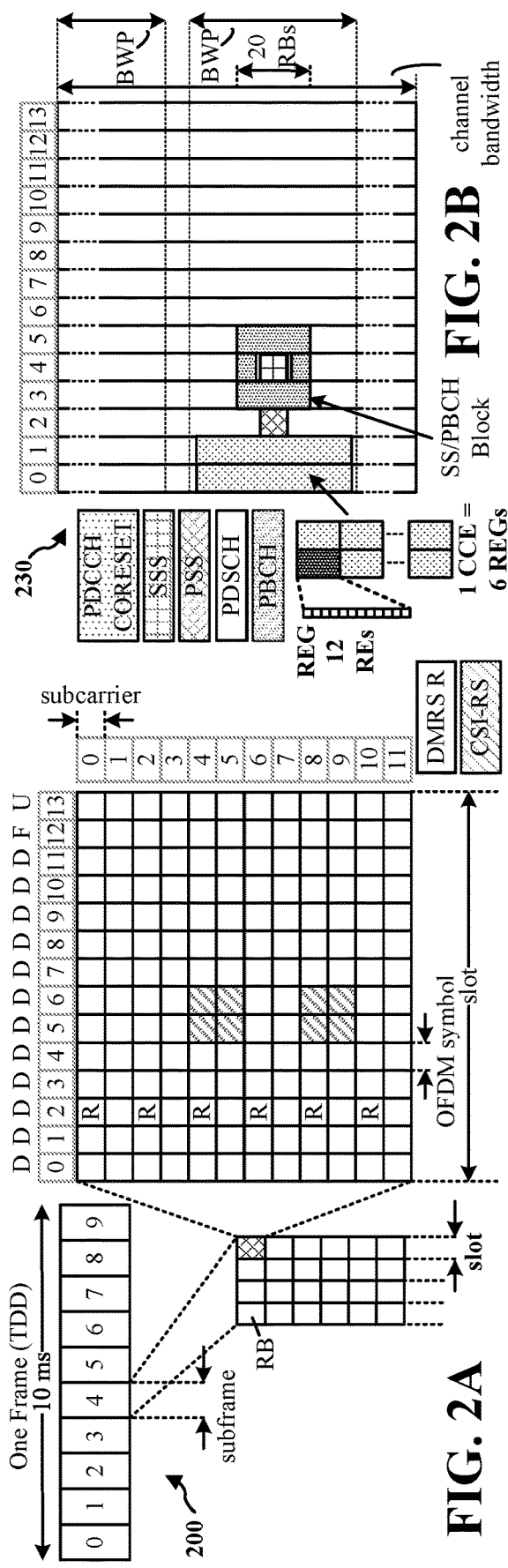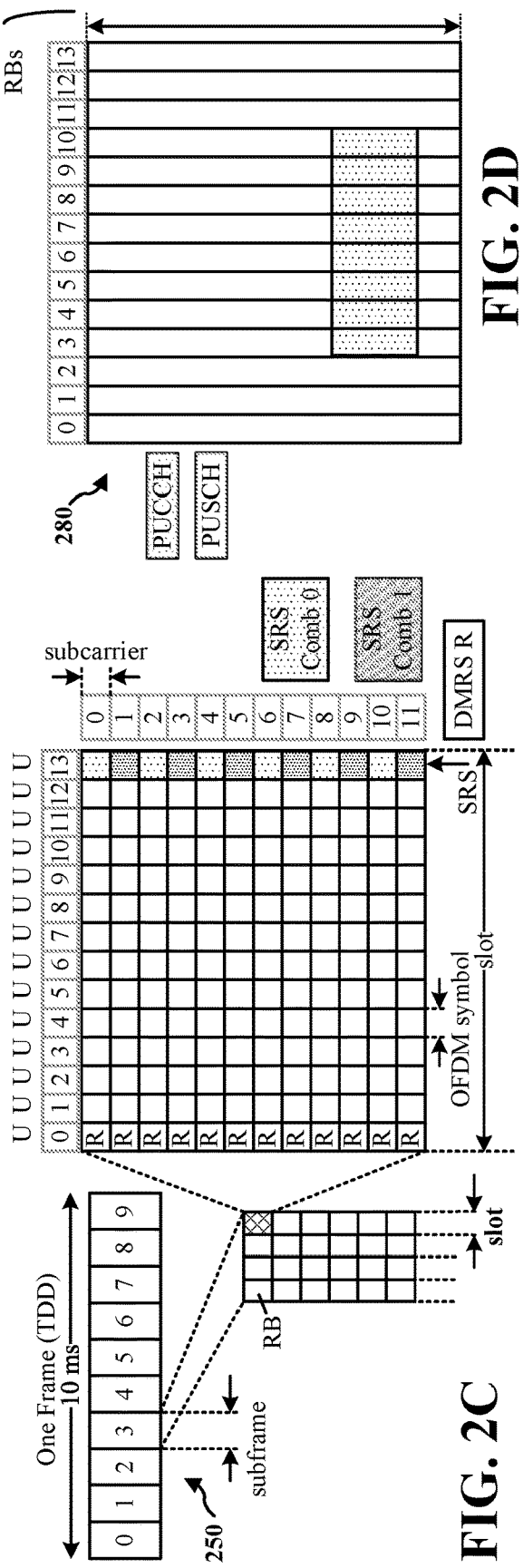
FIG. 2A  FIG. 2B  FIG. 2C  FIG. 2D

METHODS AND APPARATUS FOR GROUP BEAM REPORTING FOR BEAM SQUINT

BACKGROUND

Technical Field

The present disclosure relates generally to communication systems, and more particularly, to beam reporting in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). In some aspects, the apparatus may receive a plurality of beams from a base station, where the plurality of beams corresponds to a plurality of downlink beams. The apparatus may also measure a plurality of beams from a base station, the plurality of beams corresponding to a plurality of subbands of a wideband channel. The apparatus may also select the one or more candidate beam groups for each subband of the plurality of subbands. Additionally, the apparatus may determine whether the plurality of beams include one or more candidate beam groups for each subband of the plurality of subbands. The apparatus may also transmit, upon determining that the plurality of beams include one or more candidate beam groups for at least one subband of the plurality of subbands, an indication of the one or more candidate beam groups for the at least one subband of the plurality of subbands. Moreover, the apparatus may communicate with the base station via the one or more candidate beam groups for the at least one subband of the plurality of subbands.

In an aspect of the disclosure, a method, a computer-readable medium, and an apparatus are provided. The apparatus may be a base station. In some aspects, the apparatus may receive a plurality of beams from a UE, where the plurality of beams corresponds to a plurality of uplink beams. The apparatus may also measure a plurality of beams from a UE, the plurality of beams corresponding to a plurality of subbands of a wideband channel. The apparatus may also select the one or more candidate beam groups for each subband of the plurality of subbands. Further, the apparatus may determine whether the plurality of beams include one or more candidate beam groups for each subband of the plurality of subbands. The apparatus may also transmit, upon determining that the plurality of beams include one or more candidate beam groups for at least one subband of the plurality of subbands, an indication of the one or more candidate beam groups for the at least one subband of the plurality of subbands. The apparatus may also communicate with the UE via the one or more candidate beam groups for the at least one subband of the plurality of subbands.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
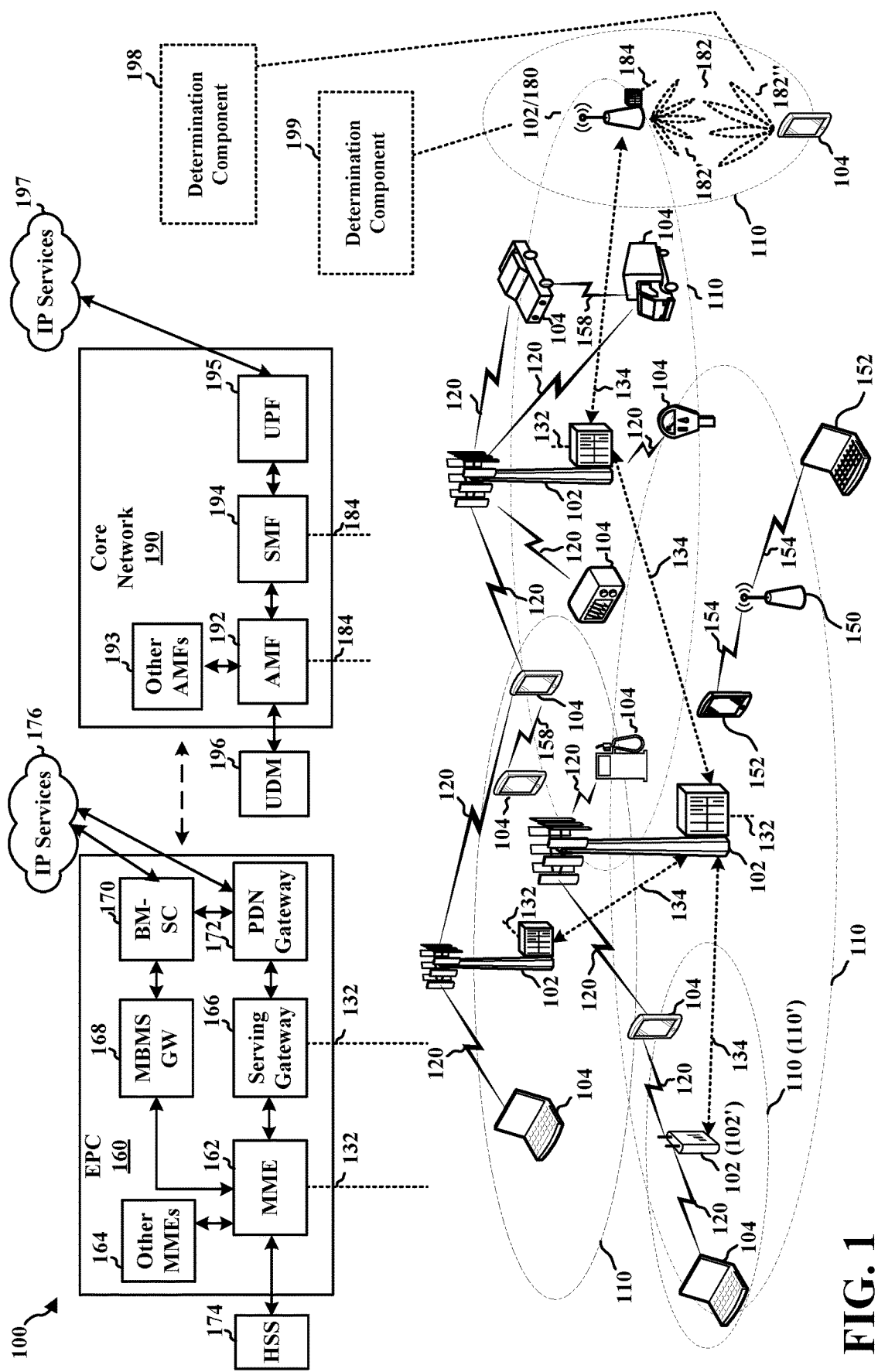
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a determination component 198 configured to receive a plurality of beams from a base station, where the plurality of beams corresponds to a plurality of downlink beams. Determination component 198 may also be configured to measure a plurality of beams from a base station, the plurality of beams corresponding to a plurality of subbands of a wideband channel. Determination component 198 may also be configured to select the one or more candidate beam groups for each subband of the plurality of subbands. Determination component 198 may also be configured to determine whether the plurality of beams include one or more candidate beam groups for each subband of the plurality of subbands. Determination component 198 may also be configured to transmit, upon determining that the plurality of beams include one or more candidate beam groups for at least one subband of the plurality of subbands, an indication of the one or more candidate beam groups for the at least one subband of the plurality of subbands. Determination component 198 may also be configured to communicate with the base station via the one or more candidate beam groups for the at least one subband of the plurality of subbands.

Referring again to FIG. 1, in certain aspects, the base station 180 may include a determination component 199 configured to receive a plurality of beams from a UE, where the plurality of beams corresponds to a plurality of uplink beams. Determination component 199 may also be configured to measure a plurality of beams from a UE, the plurality of beams corresponding to a plurality of subbands of a wideband channel. Determination component 199 may also be configured to select the one or more candidate beam groups for each subband of the plurality of subbands. Determination component 199 may also be configured to determine whether the plurality of beams include one or more candidate beam groups for each subband of the plurality of subbands. Determination component 199 may also be configured to transmit, upon determining that the plurality of beams include one or more candidate beam groups for at least one subband of the plurality of subbands, an indication of the one or more candidate beam groups for the at least one subband of the plurality of subbands. Determination component 199 may also be configured to communicate with the UE via the one or more candidate beam groups for the at least one subband of the plurality of subbands Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
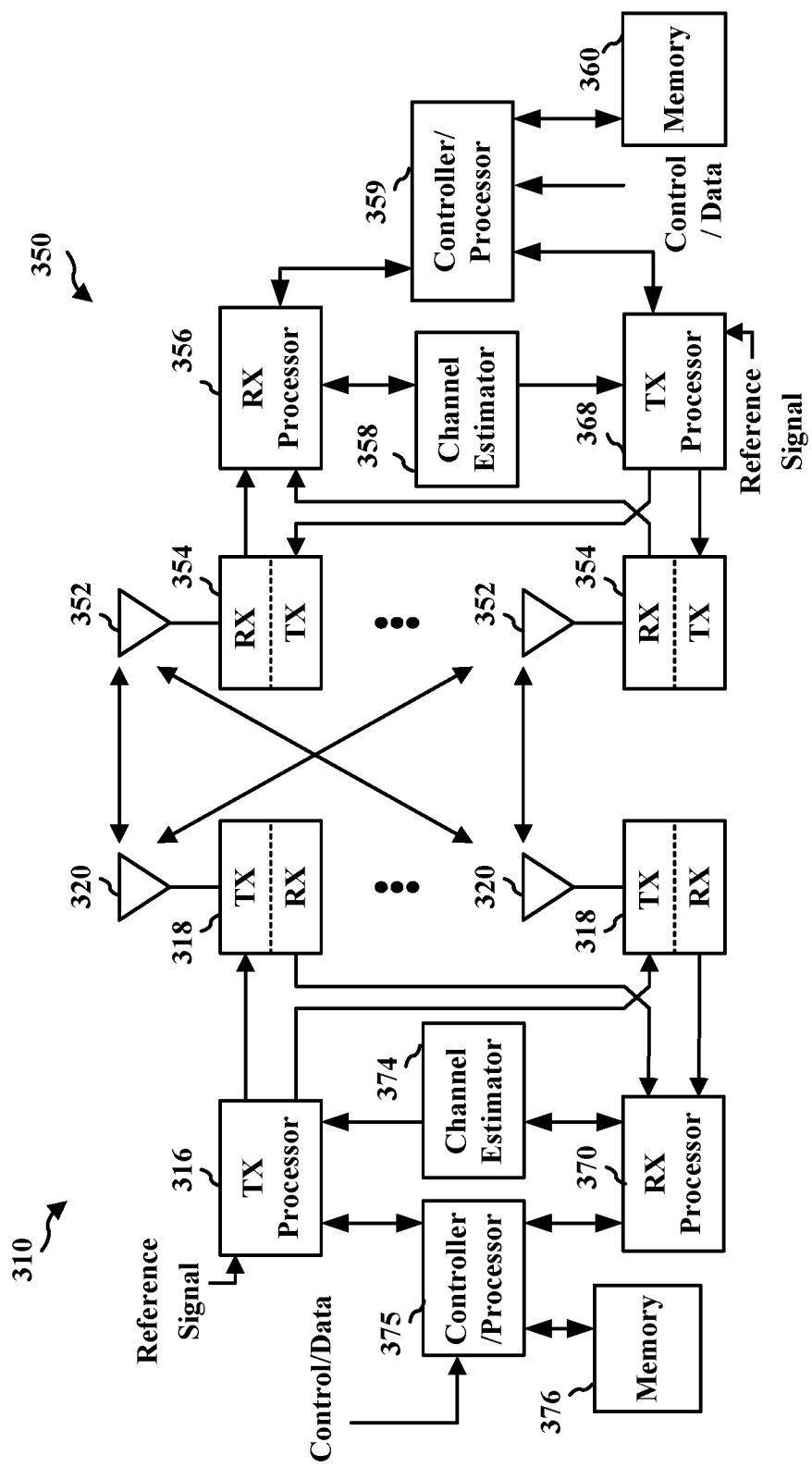
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communications may utilize a beamforming pattern that is optimized to operate on a certain frequency. In some instances, deviating from this optimized frequency may result in squinting of the resultant beam, i.e., beam squint. This issue of beam squint may become more tangible when communication links operate over a wideband channel, but rely on beams that are optimized on a subset of this wideband. This may also result in various levels of performance degradation depending on the level of beam squint.

In some aspects, a UE may be more likely to operate on a portion of the wideband channel, i.e., a subband (SB). Also, the UE may report information to a base station to help evaluate the beam squint and/or select the most suitable beam(s) for operation on an subband basis. The UE can also report a pair of beams to support simultaneous multi-beam operation. This may be enabled by a certain parameter, e.g., the GroupBasedBeamReporting higher layer parameter. In some instances, the reported beam pair might not be suitable for wideband operation due to beam squint. Therefore, group beam reporting may need to be subband specific. Accordingly, it may be beneficial to consider options for SB-based group beam reporting.

Figure 4:
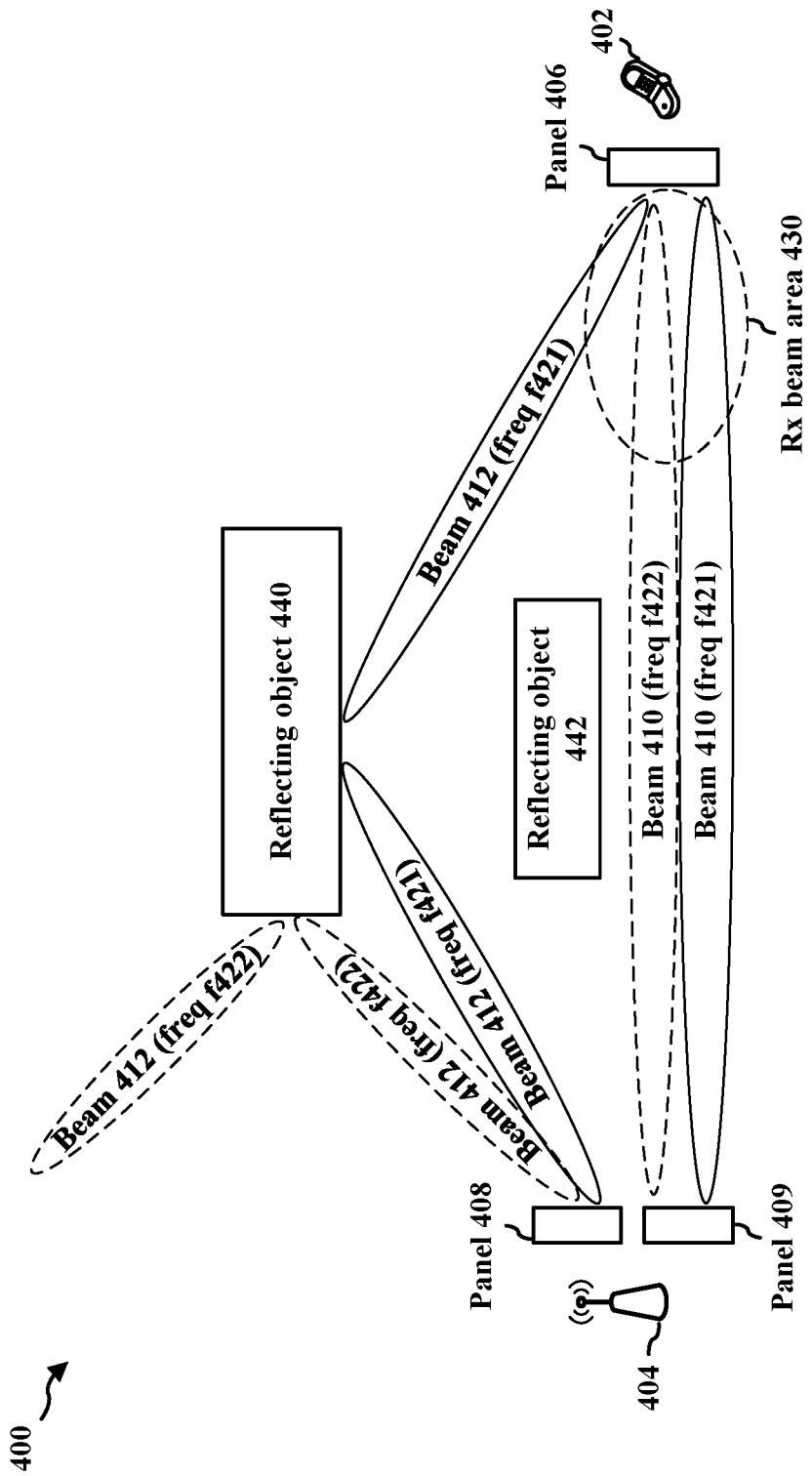
FIG. 4 is a diagram illustrating example communication between a UE and a base station.

FIG. 4 is a diagram 400 of wireless communication between a UE, e.g., UE 402, and a base station, e.g., base station 404. More specifically, FIG. 4 illustrates wireless communication including multi-beam operation and beam squint. As shown in FIG. 4, diagram 400 includes UE 402, base station 404, beam 410, beam 412, and receive (Rx) beam area 430. Diagram 400 also includes a number of reflecting objects, e.g., reflecting object 440 and reflecting object 442. As illustrated in FIG. 4, UE 402 may have one panel, e.g., panel 406, but any appropriate amount of panels can be utilized, e.g., two panels. Base station 404 may have two panels, e.g., panel 408 and panel 409, but any appropriate amount of panels can be utilized, e.g., one panel.

In some instances, UE 402 may be able to receive both beam 410 and beam 412 at a certain frequency, e.g., frequency f421. As such, beam 410 and beam 412 may be a suitable beam pair at frequency f421. Also, UE 402 may be able to receive beam 410 at another frequency, e.g., frequency f422. However, UE 402 may not be able to receive beam 412 at this frequency, e.g., frequency f422, due to beam squint. Additionally, UE 402 may report to base station 404 that beam 410 and beam 412 are no longer a suitable beam pair at this frequency, e.g., frequency f422.

Based on the above, it may be beneficial to provide options for SB-based group beam reporting for UEs and/or base stations. It may also be beneficial to provide options for compressed SB-based group beam reporting for UEs and/or base stations. Further, it may be beneficial to provide options for SB-based group beam reporting for configured beam groups or beam tuples.

Aspects of the present disclosure may include options for different types of group beam reporting for UEs and/or base stations, such as SB-based group beam reporting. Additionally, aspects of the present disclosure may include options for compressed group beam reporting for UEs and/or base stations, e.g., SB-based group beam reporting. Aspects of the present disclosure may also include options for SB-based group beam reporting for different types of group beam groups, such as configured beam tuples.

As indicated above, aspects of the present disclosure may include SB-based group beam reporting. For instance, a UE may conduct SB-based measurements for a set of candidate beams on a set of candidate SBs. The UE may derive beam tuples and report up to a certain amount of beam tuples, e.g., $N_b$ beam tuples, per each SB using an index map. To decide whether a beam tuple is suitable, a UE can compare measurements with a predefined threshold, such as thresholds that may be SB specific. Also, a maximum tuple size, i.e., a maximum number of beams per tuple, can be SB specific. A maximum number of beam tuples to be reported, i.e., $N_b$, per each SB can be SB specific. Further, the sets of candidate beams and SBs can be selected by a base station/network or a UE. The beam reporting can be periodic, aperiodic, or semi-persistent.

Figure 5:
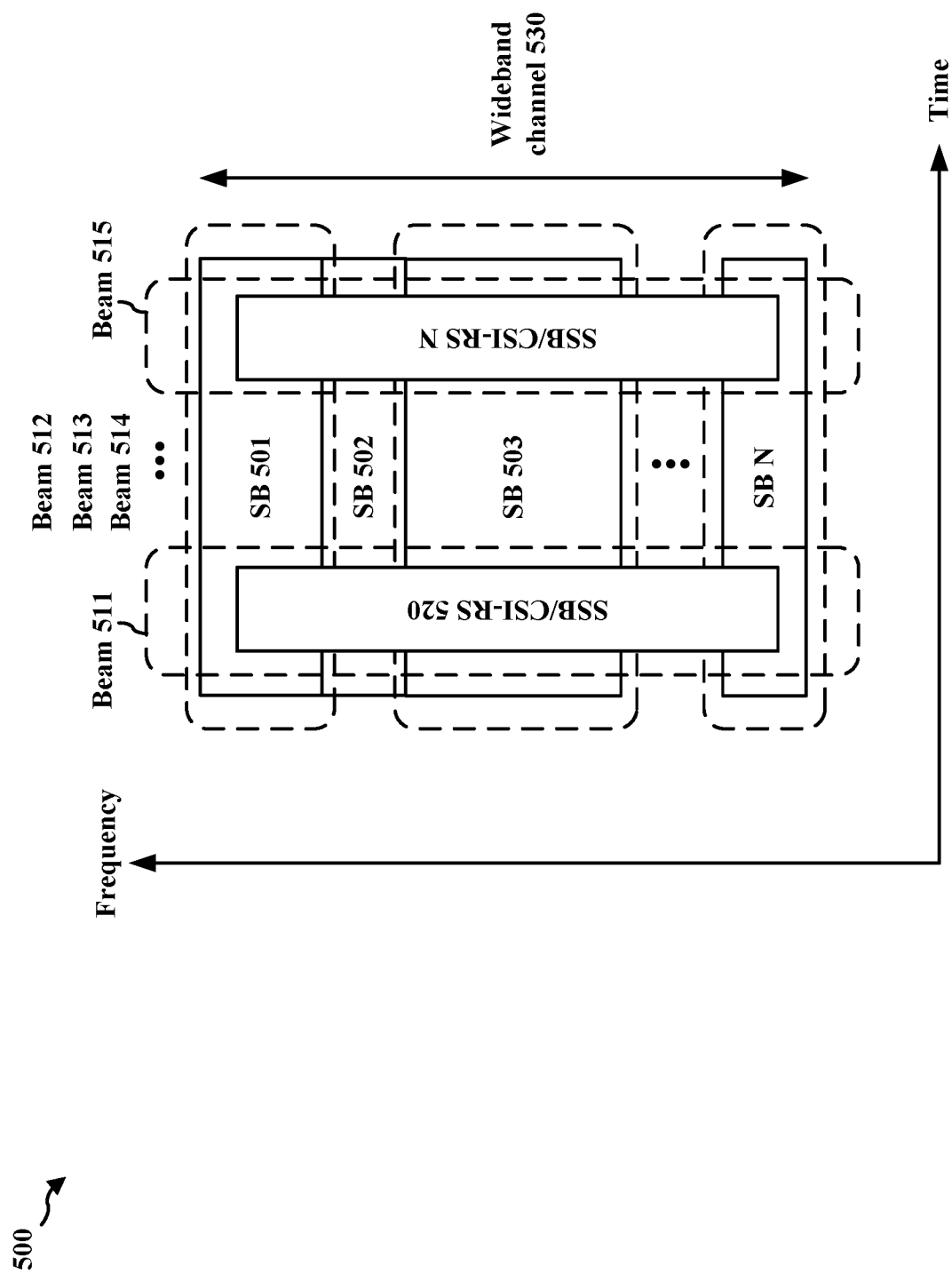
FIG. 5 is a diagram illustrating example group beam reporting in wireless communications.

FIG. 5 is a diagram 500 of group beam reporting in wireless communications, e.g., SB-based group beam reporting. As shown in FIG. 5, diagram 500 includes a number of SBs in wideband channel 530, e.g., SB 501, SB 502, SB 503, SB N. As illustrated in FIG. 5, the SBs can span both time and frequency. Diagram 500 also includes a number of candidate beams, e.g., beam 511, beam 512, beam 513, beam 514, and beam 515. Further, diagram 500 includes a number of SSBs/CSI-RS, e.g., SSB/CSI-RS 520, . . . , SSB/CSI-RS N.

In some aspects, a UE may report beam tuples for a number of candidate SBs, such as three candidate SBs, e.g., SB 501, SB 503, and SB N in FIG. 5. As depicted in FIG. 5, the candidate beams may be beam 511, beam 512, beam 513, beam 514, and beam 515. The beam ID for each of the candidate beams may be referenced by a CSI-RS index. Also, the maximum number of beam tuples to be reported may be equal to three (3) for all SBs, e.g., $N_b$=3.

TABLE 1

| | Beam 511 | Beam 512 | Beam 513 | Beam 514 | Beam 515 |
|---|---|---|---|---|---|
| SB 501 | 1 | 2 | 1, 2 | 2 | 0 |
| SB 503 | 0 | 1, 2, 3 | 1 | 2 | 3 |
| SB N | 0 | 1 | 0 | 0 | 1 |

Table 1 above depicts an uncompressed index map matrix for the candidate beams and SBs displayed in FIG. 5. As depicted in Table 1, an index of 0 corresponds to no beam tuple, an index of 1 corresponds to one tuple index value, e.g., tuple-idx-1, an index of 2 corresponds to another tuple index value, e.g., tuple-idx-2, and an index of 3 corresponds to another tuple index value, e.g., tuple-idx-3. As shown in Table 1, a UE may determine two candidate beam tuples for SB 501, including one candidate beam tuple with beam 511 and beam 513, i.e., (beam 511, beam 513), and another candidate beam tuple with beam 512, beam 513, and beam 514, i.e., (beam 512, beam 513, beam 514). The UE may also determine three candidate beam tuples for SB 503, e.g., (beam 512, beam 513), (beam 512, beam 514), and (beam 512, beam 515). Further, the UE may determine one candidate beam tuple for SB N, e.g., (beam 512, beam 515).

Aspects of the present disclosure may also include compressed SB-based group beam reporting. For instance, a UE may conduct SB-based measurements for a set of candidate beams on a set of candidate SBs. The UE may derive beam tuples and report up to a certain amount of beam tuples, e.g., $N_b$ beam tuples, per each SB using a compressed representation. To decide whether a beam tuple is suitable, a UE can compare measurements with a predefined threshold, such as thresholds that may be SB specific. Moreover, a maximum tuple size, i.e., a maximum number of beams per tuple, can be SB specific. A maximum number of beam tuples to be reported, i.e., $N_b$, per each SB can be SB specific. Additionally, the sets of candidate beams and SBs can be selected by a base station/network or a UE. The beam reporting can be periodic, aperiodic, or semi-persistent.

As indicated above, a UE may report beam tuples for a number of candidate SBs, such as three candidate SBs, e.g., SB 501, SB 503, and SB N in FIG. 5. As depicted in FIG. 5, the candidate beams may be beam 511, beam 512, beam 513, beam 514, and beam 515. The beam ID for each of the candidate beams may be referenced by a CSI-RS index. Also, the maximum number of beam tuples to be reported may be equal to three (3) for all SBs, e.g., $N_b$=3.

TABLE 2

| | Beam 511 | Beam 512 | Beam 513 | Beam 514 | Beam 515 |
|---|---|---|---|---|---|
| SB 501 | 1 | 2 | 1, 2 | 2 | 0 |
| SB 503 | 0 | 1, 2, 3 | 1 | 2 | 3 |
| SB N | 0 | 1 | 0 | 0 | 1 |

Table 2 above depicts an uncompressed index map matrix for the candidate beams and SBs displayed in FIG. 5. As depicted in Table 2, an index of 0 corresponds to no beam tuple, an index of 1 corresponds to one tuple index value, e.g., tuple-idx-1, an index of 2 corresponds to another tuple index value, e.g., tuple-idx-2, and an index of 3 corresponds to another tuple index value, e.g., tuple-idx-3. As shown in Table 2, the UE may determine two candidate beam tuples for SB 501 including one candidate beam tuple with beam 511 and beam 513, i.e., (beam 511, beam 513), and another candidate beam tuple with beam 512, beam 513, and beam 514, i.e., (beam 512, beam 513, beam 514). The UE may also determine three candidate beam tuples for SB 503, e.g., (beam 512, beam 513), (beam 512, beam 514), and (beam 512, beam 515). Also, the UE may also determine one candidate beam tuple for SB N, e.g., (beam 512, beam 515).

Additionally, Table 2 may be associated with an index of beams. For example, beam 511 can correspond to index 0, beam 512 can correspond to index 1, beam 513 can correspond to index 2, beam 514 can correspond to index 3, and beam 515 can correspond to index 4. Table 2 can also correspond to a compressed representation of the beam tuple reporting. For instance, the compressed representation can include a tuple index and a beam index for each SB. For example, SB 501 can be associated with tuple-idx-1 (0,2) and tuple-idx-2 (1, 2, 3), where the index of beam 511 is 0, the index of beam 512 is 1, the index of beam 513 is 2, the index of beam 514 is 3, and the index of beam 515 is 4. Also, SB 503 can be associated with tuple-idx-1 (1,2), tuple-idx-2 (1, 3), and tuple-idx-3 (1, 4). SB N can be associated with tuple-idx-1 (1,4).

Aspects of the present disclosure may also include SB-based group beam reporting for configured beam tuples. A UE may conduct SB-based measurements for a set of candidate beam pairs (or tuples) and the UE may report bitmaps of SBs that are suitable. To decide whether a beam tuple is still suitable, the UE can compare measurements with a predefined threshold, where the thresholds can be beam-tuple specific. Candidate beam tuples can be selected by either a base station/network or a UE. Targeted SBs to be monitored can be selected by the base station/network or the UE, where the targeted SBs can be beam tuple specific. Also, the group beam reporting can be periodic, aperiodic, or semi-persistent.

TABLE 3

|  | SB 501 | SB 502 | SB 503 | SB 504 | ... | SB N |
|---|---|---|---|---|---|---|
| Beam 511, Beam 515 | 1 | 1 | 1 | 0 | ... | 1 |
| Beam 512, Beam 513 | 0 | 1 | 1 | 1 | ... | 0 |

Table 3 above depicts an uncompressed bitmap matrix for the candidate beams and SBs displayed in FIG. 5. As shown in Table 3, in some aspects, a UE may determine two candidate beam tuples, e.g., (beam 511, beam 515) and (beam 512, beam 513). The candidate beam tuple (beam 511, beam 515) may correspond to a first beam pair, i.e., beam pair 1, and the candidate beam tuple (beam 512, beam 513) may correspond to a second beam pair, i.e., beam pair 2. The UE may report two bitmaps indicating the applicability of the candidate beam tuples to a certain number of SBs, e.g., N SBs. For example, beam pair 1 (beam 511, beam 515) may correspond to bitmap 1 including a certain value, e.g., [1110 . . . 1']. Beam pair 2 (beam 512, beam 513) may correspond to bitmap 2 including another value, e.g., [0111 . . . 0'].

Additionally, aspects of the present disclosure may include compressed SB-based group beam reporting for configured beam tuples. For instance, a UE may conduct SB-based measurements for a set of candidate beam pairs (or tuples) and the UE may report a compressed representation of bitmaps of SBs that are suitable. To decide whether a beam tuple is still suitable, the UE can compare measurements with a predefined threshold, where the thresholds can be beam-tuple specific. Candidate beam tuples can be selected by either a base station/network or a UE. Targeted SBs to be monitored can be selected by the base station/network or the UE, where the targeted SBs can be beam tuple specific. Also, the beam reporting can be periodic, aperiodic, or semi-persistent.

TABLE 4

|  | SB 501 | SB 502 | SB 503 | SB 504 | ... | SB N |
|---|---|---|---|---|---|---|
| Beam 511, Beam 515 | 1 | 1 | 1 | 0 | ... | 1 |
| Beam 512, Beam 513 | 0 | 1 | 1 | 1 | ... | 0 |

Table 4 above depicts an uncompressed bitmap matrix for the candidate beams and SBs displayed in FIG. 5. As shown in Table 4, in some aspects, a UE may determine two candidate beam tuples, e.g., (beam 511, beam 515) and (beam 512, beam 513). The candidate beam tuple (beam 511, beam 515) may correspond to a first beam tuple, i.e., beam tuple 1, and the candidate beam tuple (beam 512, beam 513) may correspond to a second beam tuple, i.e., beam tuple 2. The UE may report two bitmaps indicating the applicability of the candidate beam tuples to a certain number of SBs, e.g., N SBs. For example, beam tuple 1 (beam 511, beam 515) may correspond to bitmap 1 including a certain value, e.g., [1110 . . . 1']. Beam tuple 2 (beam 512, beam 513) may correspond to bitmap 2 including another value, e.g., [0111 . . . 0'].

The uncompressed bitmap matrix in Table 4 may also correspond to a number of compressed representations or compressed bitmaps matrices. For example, the uncompressed bitmap matrix in Table 4 may correspond to a discrete compressed bitmap matrix, including multiple tuple beam indexes, e.g., Tuple-idx-1=(1, 2, 3, N) and Tuple-idx-2=(2, 3, 4), where 1 corresponds to SB 501, 2 corresponds to SB 502, etc. Also, the uncompressed bitmap matrix in Table 4 may correspond to a compressed bitmap matrix with a starting SB and an ending SB. For instance, the compressed bitmap matrix may include different tuple beam indexes, e.g., Tuple-idx-1=[(1, 3), (N)] and Tuple-idx-2=[(2, 4)], where 1 corresponds to SB 501, 2 corresponds to SB 502, etc.

In some instances, aspects of the present disclosure may include non-guaranteed SB-based group beam reporting. For instance, if a UE finds no suitable tuples that can meet the condition for beam grouping on a certain SB, then the UE may report the best number of beams, e.g., $N_g$ beams, for an SB with a similar number of reports, e.g., $N_g$ reports, where $N_g$ can be SB specific. $N_g$ can also be selected by the base station/network or the UE. Reporting can also be periodic, aperiodic, or semi-persistent. For each SB, the UE may report the beams that can be received with no beam grouping using a single RS report.

In some instances, aspects of the present disclosure may include SB-based group beam measurement reporting. For instance, a UE may conduct SB-based measurements for a set of candidate beams and/or beam tuples. After deriving suitable beam tuples and/or single beams, as indicated above, a UE can report with each tuple regular or differential measurements, e.g., L1-RSRP, L1-SINR, and RSRQ, for beams in the same tuple. The sets of candidate beams and SBs can be selected by either a base station/network or a UE. Also, reporting can be periodic, aperiodic, or semi-persistent.

Figure 6:
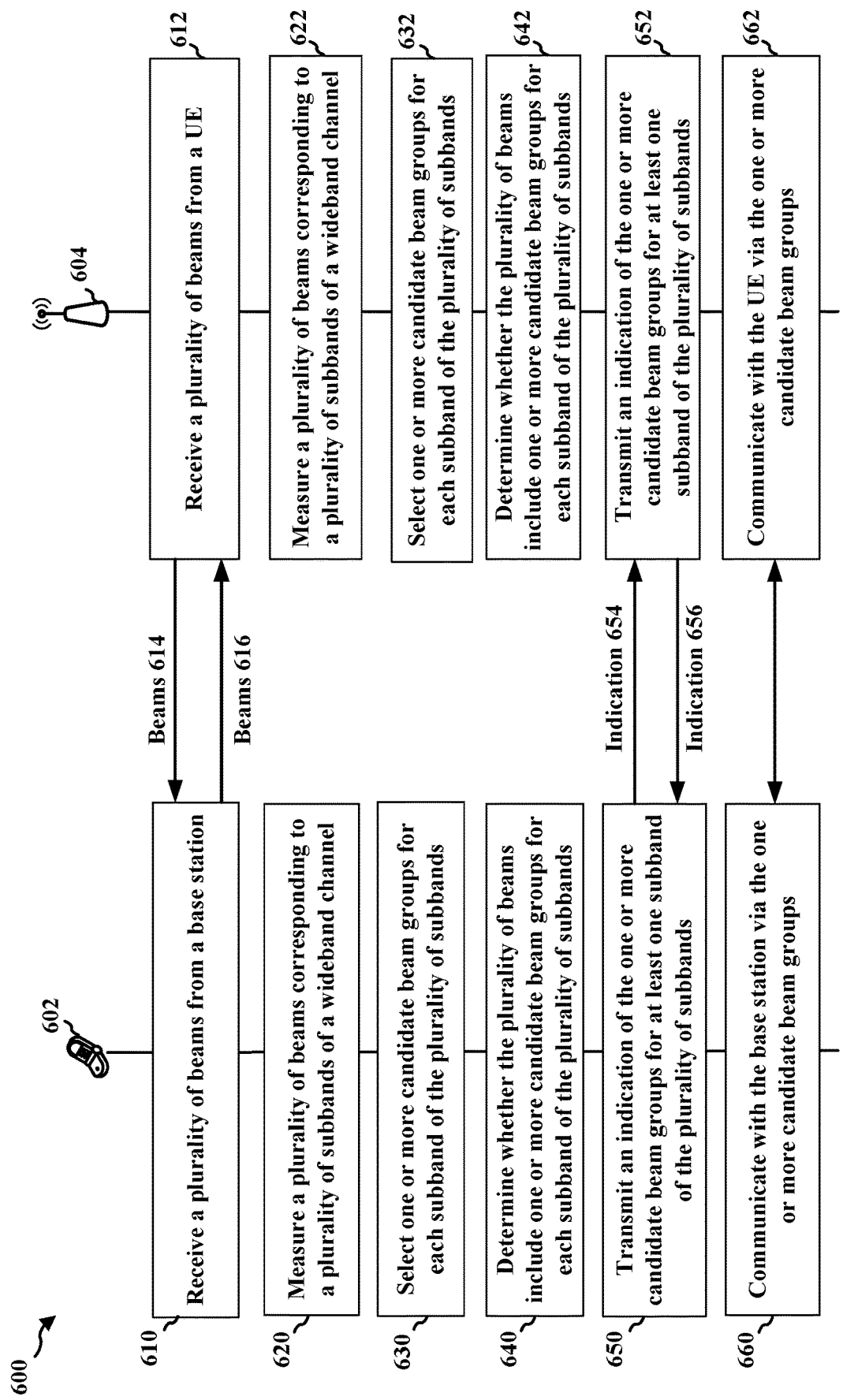
FIG. 6 is a diagram illustrating example communication between a UE and a base station.

FIG. 6 is a diagram 600 illustrating communication between a UE 602 and a base station 604. The UE 602 may correspond to UE 104, 350, 402, and apparatus 902, and the base station 604 may correspond to base station 180, 310, 404, and apparatus 1002.

At 610, UE 602 may receive a plurality of beams, e.g., beams 614, from a base station, e.g., base station 604, where the plurality of beams corresponds to a plurality of downlink beams. At 612, base station 604 may receive a plurality of beams, e.g., beams 616, from a UE, e.g., UE 602, where the plurality of beams corresponds to a plurality of uplink beams.

At 620, UE 602 may measure a plurality of beams, e.g., beams 614, from a base station, e.g., base station 604, the plurality of beams corresponding to a plurality of subbands of a wideband channel. At 622, base station 604 may measure a plurality of beams, e.g., beams 616, from a UE, e.g., UE 602, the plurality of beams corresponding to a plurality of subbands of a wideband channel.

At 630, UE 602 may select one or more candidate beam groups for each subband of the plurality of subbands. At 632, base station 604 may select one or more candidate beam groups for each subband of the plurality of subbands. In some aspects, the one or more candidate beam groups may correspond to one or more beam tuples.

At 640, UE 602 may determine whether the plurality of beams, e.g., beams 614, include one or more candidate beam groups for each subband of the plurality of subbands. At 642, base station 604 may determine whether the plurality of beams, e.g., beams 616, include one or more candidate beam groups for each subband of the plurality of subbands.

At 650, UE 602 may transmit, upon determining that the plurality of beams, e.g., beams 614, include one or more candidate beam groups for at least one subband of the plurality of subbands, an indication of the one or more candidate beam groups for the at least one subband of the plurality of subbands, e.g., indication 654. At 652, base station 604 may transmit, upon determining that the plurality of beams, e.g., beams 616, include one or more candidate beam groups for at least one subband of the plurality of subbands, an indication of the one or more candidate beam groups for the at least one subband of the plurality of subbands, e.g., indication 656.

The indication of the one or more candidate beam groups, e.g., indication 654/656, may correspond to at least one index map. In some instances, a beam tuple for each of the plurality of subbands may be based on the at least one index map. The indication of the one or more candidate beam groups, e.g., indication 654/656, may further correspond to a compressed representation associated with the at least one index map. In some aspects, the indication of the one or more candidate beam groups, e.g., indication 654/656, may correspond to at least one bitmap. The indication of the one or more candidate beam groups, e.g., indication 654/656, may further correspond to a compressed representation associated with the at least one bitmap. Additionally, the indication of the one or more candidate beam groups, e.g., indication 654/656, may correspond to one or more default candidate beams when the plurality of beams does not include one or more candidate beam groups for each subband of the plurality of subbands. The indication of the one or more candidate beam groups, e.g., indication 654/656, may also include at least one of a plurality of beam measurements or a plurality of beam parameters.

At 660, UE 602 may communicate with the base station, e.g., base station 604, via the one or more candidate beam groups for the at least one subband of the plurality of subbands. At 662, base station 604 may communicate with the UE, e.g., UE 602, via the one or more candidate beam groups for the at least one subband of the plurality of subbands.

Figure 7:
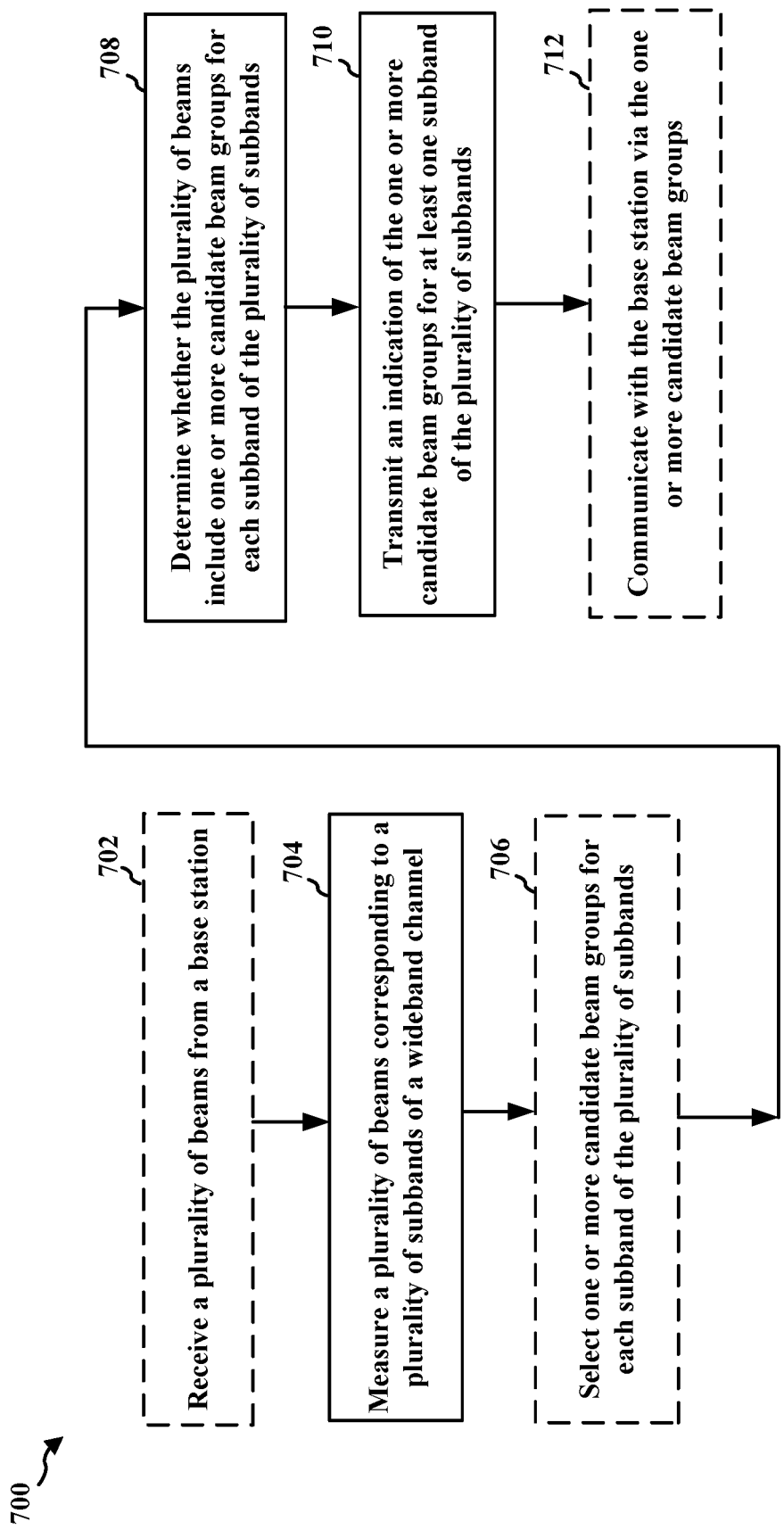
FIG. 7 is a flowchart of a method of wireless communication.

FIG. 7 is a flowchart 700 of a method of wireless communication. The method may be performed by an apparatus, such as a UE or a component of a UE (e.g., the UE 104, 350, 402, 602; apparatus 902). Optional aspects are illustrated with a dashed line. The methods described herein can provide a number of benefits, such as improving communication signaling, resource utilisation, and/or power savings.

At 702, the apparatus may receive a plurality of beams from a base station, where the plurality of beams corresponds to a plurality of downlink beams, as described in connection with the examples in FIGS. 4, 5, and 6. For example, as described in 610 of FIG. 6, UE 602 may receive a plurality of beams from base station 604, where the plurality of beams corresponds to a plurality of downlink beams. Further, 702 may be performed by determination component 940 from FIG. 9.

At 704, the apparatus may measure a plurality of beams from a base station, the plurality of beams corresponding to a plurality of subbands of a wideband channel, as described in connection with the examples in FIGS. 4, 5, and 6. For example, as described in 620 of FIG. 6, UE 602 may measure a plurality of beams from base station 604, the plurality of beams corresponding to a plurality of subbands of a wideband channel. Further, 704 may be performed by determination component 940 from FIG. 9.

At 706, the apparatus may select one or more candidate beam groups for each subband of the plurality of subbands, as described in connection with the examples in FIGS. 4, 5, and 6. For example, as described in 630 of FIG. 6, UE 602 may select one or more candidate beam groups for each subband of the plurality of subbands. Further, 706 may be performed by determination component 940 from FIG. 9. In some aspects, the one or more candidate beam groups may correspond to one or more beam tuples.

At 708, the apparatus may determine whether the plurality of beams include one or more candidate beam groups for each subband of the plurality of subbands, as described in connection with the examples in FIGS. 4, 5, and 6. For example, as described in 640 of FIG. 6, UE 602 may determine whether the plurality of beams include one or more candidate beam groups for each subband of the plurality of subbands. Further, 708 may be performed by determination component 940 from FIG. 9.

At 710, the apparatus may transmit, upon determining that the plurality of beams include one or more candidate beam groups for at least one subband of the plurality of subbands, an indication of the one or more candidate beam groups for the at least one subband of the plurality of subbands, as described in connection with the examples in FIGS. 4, 5, and 6. For example, as described in 650 of FIG. 6, UE 602 may transmit, upon determining that the plurality of beams include one or more candidate beam groups for at least one subband of the plurality of subbands, an indication of the one or more candidate beam groups for the at least one subband of the plurality of subbands. Further, 710 may be performed by determination component 940 from FIG. 9.

The indication of the one or more candidate beam groups may correspond to at least one index map. In some instances, a beam tuple for each of the plurality of subbands may be based on the at least one index map. The indication of the one or more candidate beam groups may further correspond to a compressed representation associated with the at least one index map. In some aspects, the indication of the one or more candidate beam groups may correspond to at least one bitmap, e.g., at least one bitmap of subbands. The indication of the one or more candidate beam groups may further correspond to a compressed representation associated with the at least one bitmap of subbands. Additionally, the indication of the one or more candidate beam groups may correspond to one or more default candidate beams when the plurality of beams does not include one or more candidate beam groups for each subband of the plurality of subbands. The indication of the one or more candidate beam groups may also include at least one of a plurality of beam measurements or a plurality of beam parameters. In some aspects, one or more measurements may be transmitted with the indication of the one or more candidate beam groups, where the one or more measurements may include one or more of a reference signal received power (RSRP), a signal-to-interference plus noise ratio (SINR), or a reference signal received quality (RSRQ).

At 712, the apparatus may communicate with the base station via the one or more candidate beam groups for the at least one subband of the plurality of subbands, as described in connection with the examples in FIGS. 4, 5, and 6. For example, as described in 660 of FIG. 6, UE 602 may communicate with base station 604 via the one or more candidate beam groups for the at least one subband of the plurality of subbands. Further, 712 may be performed by determination component 940 from FIG. 9.

Figure 8:
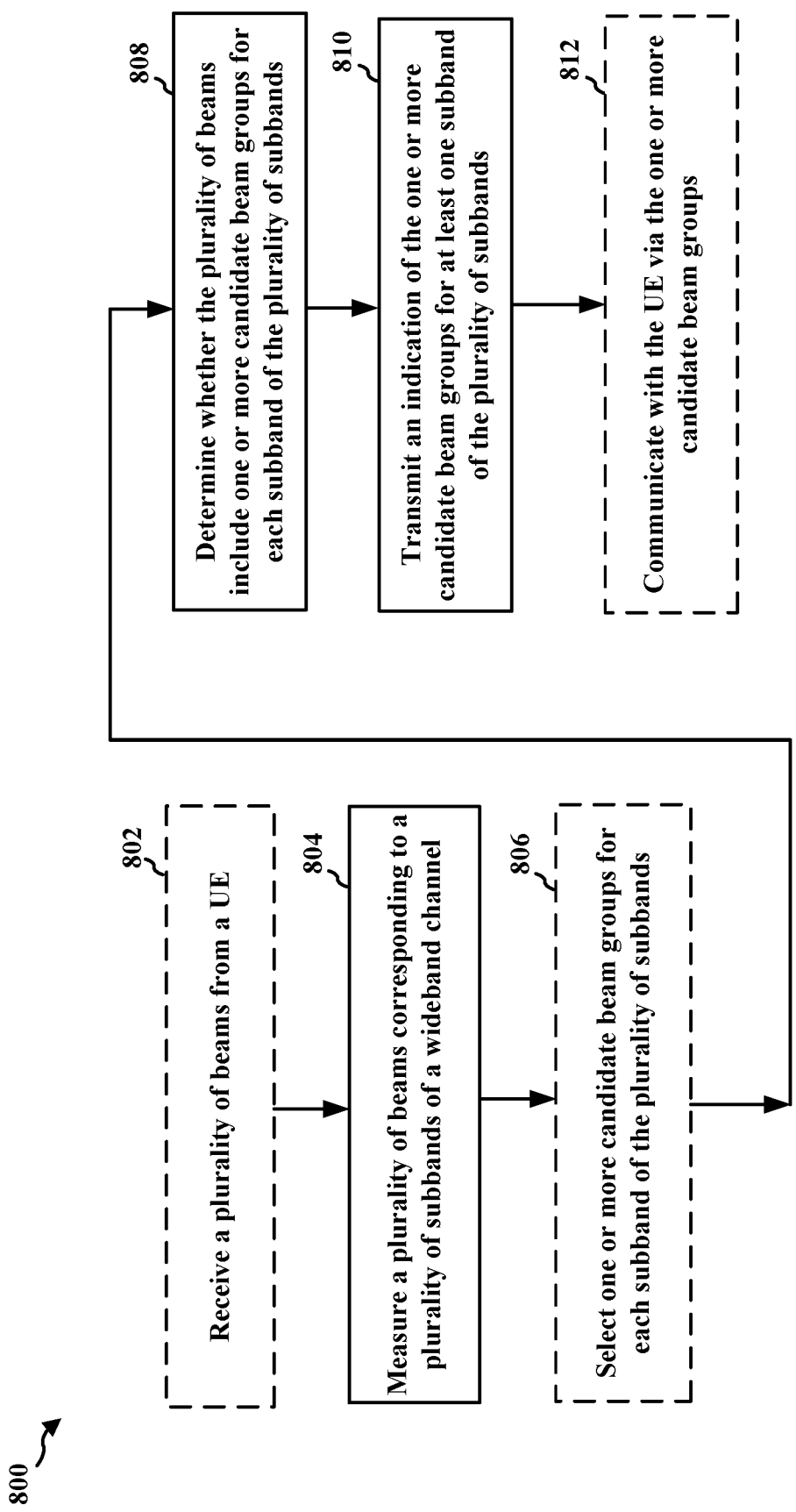
FIG. 8 is a flowchart of a method of wireless communication.

FIG. 8 is a flowchart 800 of a method of wireless communication. The method may be performed by an apparatus, such as base station or a component of a base station (e.g., the base station 180, 310, 404, 604; apparatus 1002). Optional aspects are illustrated with a dashed line. The methods described herein can provide a number of benefits, such as improving communication signaling, resource utilisation, and/or power savings.

At 802, the apparatus may receive a plurality of beams from a UE, where the plurality of beams corresponds to a plurality of uplink beams, as described in connection with the examples in FIGS. 4, 5, and 6. For example, as described in 612 of FIG. 6, base station 604 may receive a plurality of beams from UE 602, where the plurality of beams corresponds to a plurality of uplink beams. Further, 802 may be performed by determination component 1040 from FIG. 10.

At 804, the apparatus may measure a plurality of beams from a UE, the plurality of beams corresponding to a plurality of subbands of a wideband channel, as described in connection with the examples in FIGS. 4, 5, and 6. For example, as described in 622 of FIG. 6, base station 604 may measure a plurality of beams from UE 602, the plurality of beams corresponding to a plurality of subbands of a wideband channel. Further, 804 may be performed by determination component 1040 from FIG. 10.

At 806, the apparatus may select one or more candidate beam groups for each subband of the plurality of subbands, as described in connection with the examples in FIGS. 4, 5, and 6. For example, as described in 632 of FIG. 6, base station 604 may select one or more candidate beam groups for each subband of the plurality of subbands. Further, 806 may be performed by determination component 1040 from FIG. 10. In some aspects, the one or more candidate beam groups may correspond to one or more beam tuples.

At 808, the apparatus may determine whether the plurality of beams include one or more candidate beam groups for each subband of the plurality of subbands, as described in connection with the examples in FIGS. 4, 5, and 6. For example, as described in 642 of FIG. 6, base station 604 may determine whether the plurality of beams include one or more candidate beam groups for each subband of the plurality of subbands. Further, 808 may be performed by determination component 1040 from FIG. 10.

At 810, the apparatus may transmit, upon determining that the plurality of beams include one or more candidate beam groups for at least one subband of the plurality of subbands, an indication of the one or more candidate beam groups for the at least one subband of the plurality of subbands, as described in connection with the examples in FIGS. 4, 5, and 6. For example, as described in 652 of FIG. 6, base station 604 may transmit, upon determining that the plurality of beams include one or more candidate beam groups for at least one subband of the plurality of subbands, an indication of the one or more candidate beam groups for the at least one subband of the plurality of subbands. Further, 810 may be performed by determination component 1040 from FIG. 10.

The indication of the one or more candidate beam groups may correspond to at least one index map. In some instances, a beam tuple for each of the plurality of subbands may be based on the at least one index map. The indication of the one or more candidate beam groups may further correspond to a compressed representation associated with the at least one index map. In some aspects, the indication of the one or more candidate beam groups may correspond to at least one bitmap of subbands. The indication of the one or more candidate beam groups may further correspond to a compressed representation associated with the at least one bitmap of subbands. Additionally, the indication of the one or more candidate beam groups may correspond to one or more default candidate beams when the plurality of beams does not include one or more candidate beam groups for each subband of the plurality of subbands. The indication of the one or more candidate beam groups may also include at least one of a plurality of beam measurements or a plurality of beam parameters. In some aspects, one or more measurements may be transmitted with the indication of the one or more candidate beam groups, where the one or more measurements may include one or more of a reference signal received power (RSRP), a signal-to-interference plus noise ratio (SINR), or a reference signal received quality (RSRQ).

At 812, the apparatus may communicate with the UE via the one or more candidate beam groups for the at least one subband of the plurality of subbands, as described in connection with the examples in FIGS. 4, 5, and 6. For example, as described in 662 of FIG. 6, base station 604 may communicate with UE 602 via the one or more candidate beam groups for the at least one subband of the plurality of subbands. Further, 812 may be performed by determination component 1040 from FIG. 10.

Figure 9:
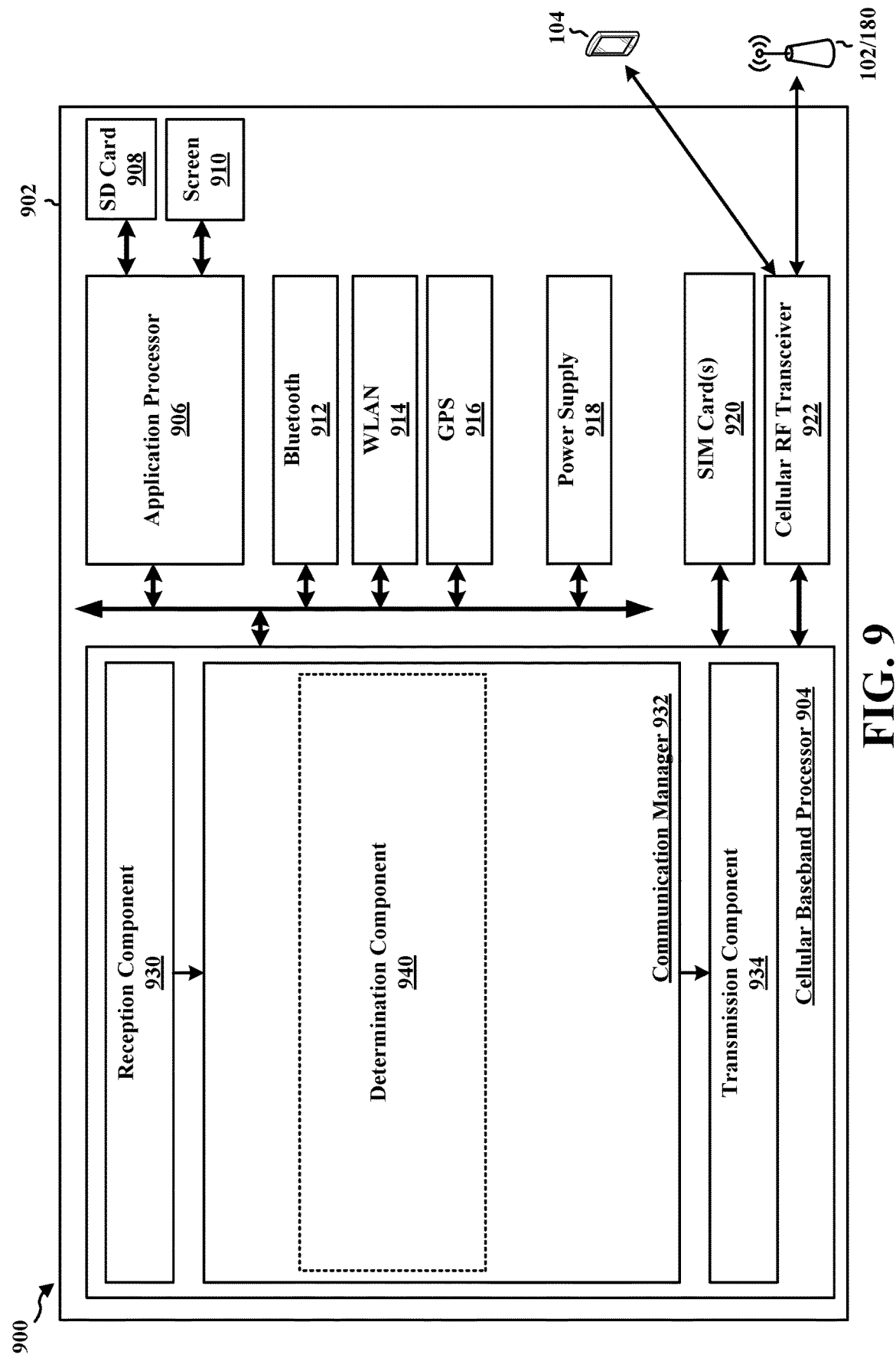
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a determination component 940 that may be configured to receive a plurality of beams from a base station, where the plurality of beams corresponds to a plurality of downlink beams, e.g., as described in connection with 702 in FIG. 7. Determination component 940 may also be configured to measure a plurality of beams from a base station, the plurality of beams corresponding to a plurality of subbands of a wideband channel, e.g., as described in connection with 704 in FIG. 7. Determination component 940 may also be configured to select one or more candidate beam groups for each subband of the plurality of subbands, e.g., as described in connection with 706 in FIG. 7. Determination component 940 may also be configured to determine whether the plurality of beams include one or more candidate beam groups for each subband of the plurality of subbands, e.g., as described in connection with 708 in FIG. 7. Determination component 940 may also be configured to transmit, upon determining that the plurality of beams include one or more candidate beam groups for at least one subband of the plurality of subbands, an indication of the one or more candidate beam groups for the at least one subband of the plurality of subbands, e.g., as described in connection with 710 in FIG. 7. Determination component 940 may also be configured to communicate with the base station via the one or more candidate beam groups for the at least one subband of the plurality of subbands, e.g., as described in connection with 712 in FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving a plurality of beams from a base station, where the plurality of beams corresponds to a plurality of downlink beams; means for measuring a plurality of beams from a base station, the plurality of beams corresponding to a plurality of subbands of a wideband channel; means for selecting one or more candidate beam groups for each subband of the plurality of subbands; means for determining whether the plurality of beams include one or more candidate beam groups for each subband of the plurality of subbands; means for transmitting, upon determining that the plurality of beams include one or more candidate beam groups for at least one subband of the plurality of subbands, an indication of the one or more candidate beam groups for the at least one subband of the plurality of subbands; and means for communicating with the base station via the one or more candidate beam groups for the at least one subband of the plurality of subbands. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
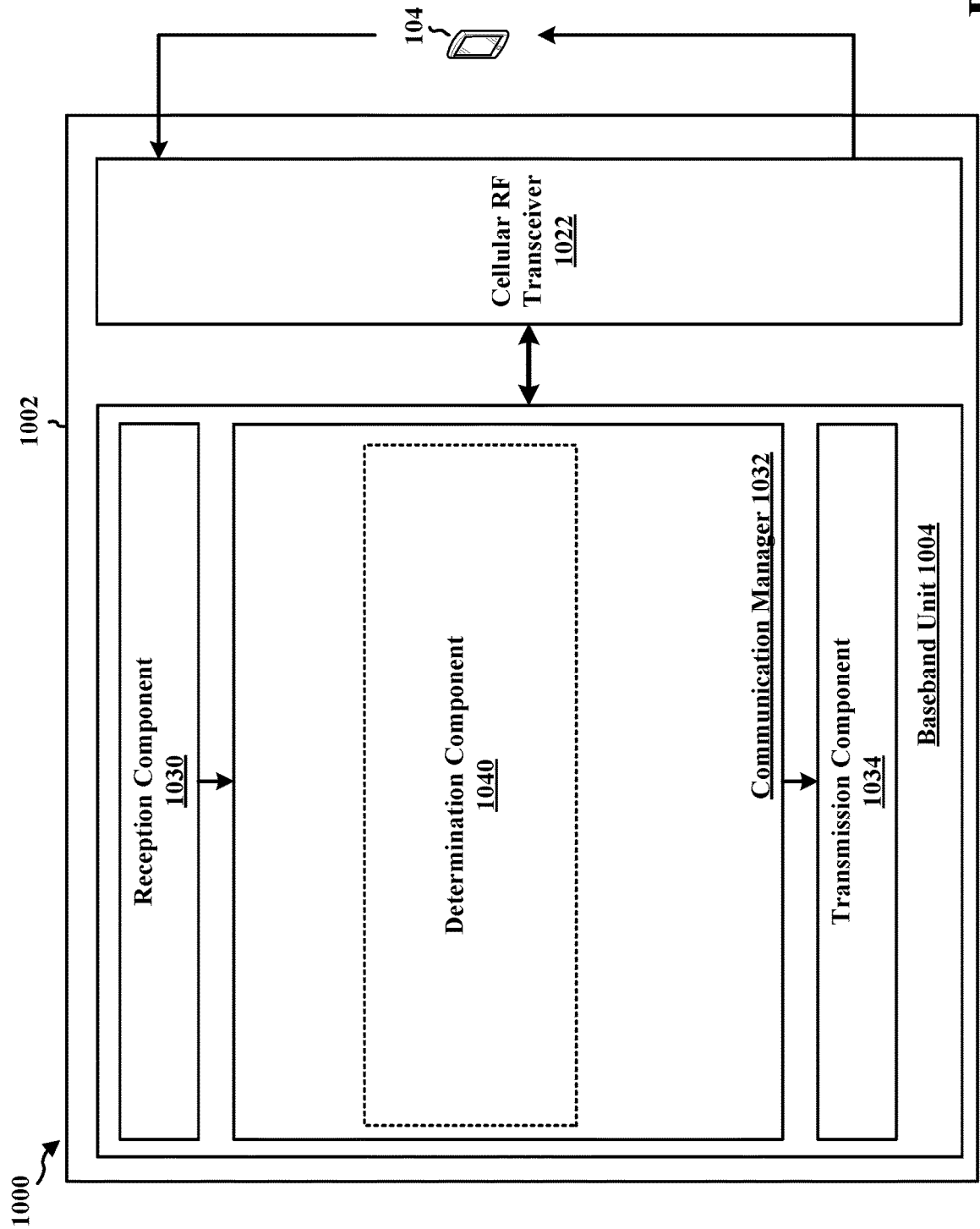
FIG. 10 is a diagram illustrating an example of a hardware implementation for an example apparatus.

FIG. 10 is a diagram 1000 illustrating an example of a hardware implementation for an apparatus 1002. The apparatus 1002 is a base station (BS) and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a determination component 1040 that may be configured to receive a plurality of beams from a UE, where the plurality of beams corresponds to a plurality of uplink beams, e.g., as described in connection with 802 in FIG. 8. Determination component 1040 may also be configured to measure a plurality of beams from a UE, the plurality of beams corresponding to a plurality of subbands of a wideband channel, e.g., as described in connection with 804 in FIG. 8. Determination component 1040 may also be configured to select the one or more candidate beam groups for each subband of the plurality of subbands, e.g., as described in connection with 806 in FIG. 8. Determination component 1040 may also be configured to determine whether the plurality of beams include one or more candidate beam groups for each subband of the plurality of subbands, e.g., as described in connection with 808 in FIG. 8. Determination component 1040 may also be configured to transmit, upon determining that the plurality of beams include one or more candidate beam groups for at least one subband of the plurality of subbands, an indication of the one or more candidate beam groups for the at least one subband of the plurality of subbands, e.g., as described in connection with 810 in FIG. 8. Determination component 1040 may also be configured to communicate with the UE via the one or more candidate beam groups for the at least one subband of the plurality of subbands, e.g., as described in connection with 812 in FIG. 8.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for receiving a plurality of beams from a UE, where the plurality of beams corresponds to a plurality of uplink beams; means for measuring a plurality of beams from a UE, the plurality of beams corresponding to a plurality of subbands of a wideband channel; means for selecting the one or more candidate beam groups for each subband of the plurality of subbands; means for determining whether the plurality of beams include one or more candidate beam groups for each subband of the plurality of subbands; means for transmitting, upon determining that the plurality of beams include one or more candidate beam groups for at least one subband of the plurality of subbands, an indication of the one or more candidate beam groups for the at least one subband of the plurality of subbands; and means for communicating with the UE via the one or more candidate beam groups for the at least one subband of the plurality of subbands. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a user equipment (UE). The method includes measuring a plurality of beams from a base station, the plurality of beams corresponding to a plurality of subbands of a wideband channel; determining whether the plurality of beams include one or more candidate beam groups for each subband of the plurality of subbands; and transmitting, upon determining that the plurality of beams include one or more candidate beam groups for at least one subband of the plurality of subbands, an indication of the one or more candidate beam groups for the at least one subband of the plurality of subbands.

Aspect 2 is the method of aspect 1, where the one or more candidate beam groups correspond to one or more beam tuples.

Aspect 3 is the method of any of aspects 1 and 2, further comprising selecting the one or more candidate beam groups for each subband of the plurality of subbands.

Aspect 4 is the method of any of aspects 1 to 3, where the indication of the one or more candidate beam groups corresponds to at least one index map.

Aspect 5 is the method of any of aspects 1 to 4, where a beam tuple for each of the plurality of subbands is based on the at least one index map.

Aspect 6 is the method of any of aspects 1 to 5, where the indication of the one or more candidate beam groups further corresponds to a compressed representation associated with the at least one index map.

Aspect 7 is the method of any of aspects 1 to 6, where the indication of the one or more candidate beam groups corresponds to at least one bitmap of subbands.

Aspect 8 is the method of any of aspects 1 to 7, where the indication of the one or more candidate beam groups further corresponds to a compressed representation associated with the at least one bitmap of subbands.

Aspect 9 is the method of any of aspects 1 to 8, where the indication of the one or more candidate beam groups corresponds to one or more default candidate beams when the plurality of beams does not include one or more candidate beam groups for each subband of the plurality of subbands.

Aspect 10 is the method of any of aspects 1 to 9, where the indication of the one or more candidate beam groups includes at least one of a plurality of beam measurements or a plurality of beam parameters.

Aspect 11 is the method of any of aspects 1 to 10, further comprising receiving the plurality of beams from the base station, where the plurality of beams corresponds to a plurality of downlink beams.

Aspect 12 is the method of any of aspects 1 to 11, further comprising communicating with the base station via the one or more candidate beam groups for the at least one subband of the plurality of subbands.

Aspect 13 is the method of any of aspects 1 to 12, where one or more measurements are transmitted with the indication of the one or more candidate beam groups, the one or more measurements including one or more of a reference signal received power (RSRP), a signal-to-interference plus noise ratio (SINK), or a reference signal received quality (RSRQ).

Aspect 14 is an apparatus for wireless communication including at least one processor coupled to a memory and configured to implement a method as in any of aspects 1 to 13.

Aspect 15 is an apparatus for wireless communication including means for implementing a method as in any of aspects 1 to 13.

Aspect 16 is a computer-readable medium storing computer executable code, where the code when executed by a processor causes the processor to implement a method as in any of aspects 1 to 13.

Aspect 17 is a method of wireless communication of a base station. The method includes measuring a plurality of beams from a user equipment (UE), the plurality of beams corresponding to a plurality of subbands of a wideband channel; determining whether the plurality of beams include one or more candidate beam groups for each subband of the plurality of subbands; and transmitting, upon determining that the plurality of beams include one or more candidate beam groups for at least one subband of the plurality of subbands, an indication of the one or more candidate beam groups for the at least one subband of the plurality of subbands.

Aspect 18 is the method of aspect 17, where the one or more candidate beam groups correspond to one or more beam tuples.

Aspect 19 is the method of any of aspects 17 and 18, further comprising selecting the one or more candidate beam groups for each subband of the plurality of subbands.

Aspect 20 is the method of any of aspects 17 to 19, where the indication of the one or more candidate beam groups corresponds to at least one index map.

Aspect 21 is the method of any of aspects 17 to 20, where a beam tuple for each of the plurality of subbands is based on the at least one index map.

Aspect 22 is the method of any of aspects 17 to 21, where the indication of the one or more candidate beam groups further corresponds to a compressed representation associated with the at least one index map.

Aspect 23 is the method of any of aspects 17 to 22, where the indication of the one or more candidate beam groups corresponds to at least one bitmap of subbands.

Aspect 24 is the method of any of aspects 17 to 23, where the indication of the one or more candidate beam groups further corresponds to a compressed representation associated with the at least one bitmap of subbands.

Aspect 25 is the method of any of aspects 17 to 24, where the indication of the one or more candidate beam groups corresponds to one or more default candidate beams when the plurality of beams does not include one or more candidate beam groups for each subband of the plurality of subbands.

Aspect 26 is the method of any of aspects 17 to 25, where the indication of the one or more candidate beam groups includes at least one of a plurality of beam measurements or a plurality of beam parameters.

Aspect 27 is the method of any of aspects 17 to 26, further comprising receiving the plurality of beams from the UE, where the plurality of beams corresponds to a plurality of uplink beams.

Aspect 28 is the method of any of aspects 17 to 27, further comprising communicating with the UE via the one or more candidate beam groups for the at least one subband of the plurality of subbands.

Aspect 29 is the method of any of aspects 17 to 28, where one or more measurements are transmitted with the indication of the one or more candidate beam groups, the one or more measurements including one or more of a reference signal received power (RSRP), a signal-to-interference plus noise ratio (SINK), or a reference signal received quality (RSRQ).

Aspect 30 is an apparatus for wireless communication including at least one processor coupled to a memory and configured to implement a method as in any of aspects 17 to 29.

Aspect 31 is an apparatus for wireless communication including means for implementing a method as in any of aspects 17 to 29.

Aspect 32 is a computer-readable medium storing computer executable code, where the code when executed by a processor causes the processor to implement a method as in any of aspects 17 to 29.

What is claimed is:

1. An apparatus for wireless communication of a user equipment (UE), comprising:
   a memory; and
   at least one processor coupled to the memory and configured to:
      measure a plurality of beams from a base station, the plurality of beams corresponding to a plurality of subbands of a wideband channel;
      determine whether the plurality of beams include one or more candidate beam groups for each subband of the plurality of subbands; and
      transmit, upon determining that the plurality of beams include one or more candidate beam groups for at least one subband of the plurality of subbands, an indication of the one or more candidate beam groups for the at least one subband of the plurality of subbands.

2. The apparatus of claim 1, wherein the one or more candidate beam groups correspond to one or more beam tuples.

3. The apparatus of claim 1, wherein the at least one processor is further configured to:
   select the one or more candidate beam groups for each subband of the plurality of subbands.

4. The apparatus of claim 1, wherein the indication of the one or more candidate beam groups corresponds to at least one index map.

5. The apparatus of claim 4, wherein a beam tuple for each of the plurality of subbands is based on the at least one index map.

6. The apparatus of claim 4, wherein the indication of the one or more candidate beam groups further corresponds to a compressed representation associated with the at least one index map.

7. The apparatus of claim 1, wherein the indication of the one or more candidate beam groups corresponds to at least one bitmap of subbands.

8. The apparatus of claim 7, wherein the indication of the one or more candidate beam groups further corresponds to a compressed representation associated with the at least one bitmap of subbands.

9. The apparatus of claim 1, wherein the indication of the one or more candidate beam groups corresponds to one or more default candidate beams when the plurality of beams does not include one or more candidate beam groups for each subband of the plurality of subbands.

10. The apparatus of claim 1, wherein the indication of the one or more candidate beam groups includes at least one of a plurality of beam measurements or a plurality of beam parameters.

11. The apparatus of claim 1, wherein the at least one processor is further configured to:
receive the plurality of beams from the base station, wherein the plurality of beams corresponds to a plurality of downlink beams.

12. The apparatus of claim 1, wherein the at least one processor is further configured to:
communicate with the base station via the one or more candidate beam groups for the at least one subband of the plurality of subbands.

13. The apparatus of claim 1, wherein one or more measurements are transmitted with the indication of the one or more candidate beam groups, the one or more measurements including one or more of a reference signal received power (RSRP), a signal-to-interference plus noise ratio (SINK), or a reference signal received quality (RSRQ).

14. A method of wireless communication of a user equipment (UE), comprising:
measuring a plurality of beams from a base station, the plurality of beams corresponding to a plurality of subbands of a wideband channel;
determining whether the plurality of beams include one or more candidate beam groups for each subband of the plurality of subbands; and
transmitting, upon determining that the plurality of beams include one or more candidate beam groups for at least one subband of the plurality of subbands, an indication of the one or more candidate beam groups for the at least one subband of the plurality of subbands.

15. The method of claim 14, wherein the one or more candidate beam groups correspond to one or more beam tuples.

16. An apparatus for wireless communication of a base station, comprising:
a memory; and
at least one processor coupled to the memory and configured to:
measure a plurality of beams from a user equipment (UE), the plurality of beams corresponding to a plurality of subbands of a wideband channel;
determine whether the plurality of beams include one or more candidate beam groups for each subband of the plurality of subbands; and
transmit, upon determining that the plurality of beams include one or more candidate beam groups for at least one subband of the plurality of subbands, an indication of the one or more candidate beam groups for the at least one subband of the plurality of subbands.

17. The apparatus of claim 16, wherein the one or more candidate beam groups correspond to one or more beam tuples.

18. The apparatus of claim 16, wherein the at least one processor is further configured to:
select the one or more candidate beam groups for each subband of the plurality of subbands.

19. The apparatus of claim 16, wherein the indication of the one or more candidate beam groups corresponds to at least one index map.

20. The apparatus of claim 19, wherein a beam tuple for each of the plurality of subbands is based on the at least one index map.

21. The apparatus of claim 19, wherein the indication of the one or more candidate beam groups further corresponds to a compressed representation associated with the at least one index map.

22. The apparatus of claim 16, wherein the indication of the one or more candidate beam groups corresponds to at least one bitmap of subbands.

23. The apparatus of claim 22, wherein the indication of the one or more candidate beam groups further corresponds to a compressed representation associated with the at least one bitmap of subbands.

24. The apparatus of claim 16, wherein the indication of the one or more candidate beam groups corresponds to one or more default candidate beams when the plurality of beams does not include one or more candidate beam groups for each subband of the plurality of subbands.

25. The apparatus of claim 16, wherein the indication of the one or more candidate beam groups includes at least one of a plurality of beam measurements or a plurality of beam parameters.

26. The apparatus of claim 16, wherein the at least one processor is further configured to:
receive the plurality of beams from the UE, wherein the plurality of beams corresponds to a plurality of uplink beams.

27. The apparatus of claim 16, wherein the at least one processor is further configured to:
communicate with the UE via the one or more candidate beam groups for the at least one subband of the plurality of subbands.

28. The apparatus of claim 16, wherein one or more measurements are transmitted with the indication of the one or more candidate beam groups, the one or more measurements including one or more of a reference signal received power (RSRP), a signal-to-interference plus noise ratio (SINR), or a reference signal received quality (RSRQ).

29. A method of wireless communication of a base station, comprising:
measuring a plurality of beams from a user equipment (UE), the plurality of beams corresponding to a plurality of subbands of a wideband channel;
determining whether the plurality of beams include one or more candidate beam groups for each subband of the plurality of subbands; and
transmitting, upon determining that the plurality of beams include one or more candidate beam groups for at least one subband of the plurality of subbands, an indication of the one or more candidate beam groups for the at least one subband of the plurality of subbands.

30. The method of claim 29, wherein the one or more candidate beam groups correspond to one or more beam tuples.

* * * * *